(12) United States Patent
Coker et al.

(10) Patent No.: US 7,193,800 B2
(45) Date of Patent: *Mar. 20, 2007

(54) DATA RECORDING MEDIUM WITH SERVO PATTERN HAVING PSEUDO-NOISE SEQUENCES

(75) Inventors: Jonathan Darrel Coker, Rochester, MN (US); David Timothy Flynn, Mantorville, MN (US); Richard Leo Galbraith, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 551 days.

This patent is subject to a terminal disclaimer.

(21) Appl. No.: 10/840,819

(22) Filed: May 6, 2004

(65) Prior Publication Data

US 2005/0249106 A1 Nov. 10, 2005

(51) Int. Cl.
*G11B 5/09* (2006.01)
(52) U.S. Cl. .......................................... 360/48; 360/75
(58) Field of Classification Search ..................... None
See application file for complete search history.

(56) References Cited

U.S. PATENT DOCUMENTS 5,253,131 A * 10/1993 Chevalier ................. 360/78.14

| | | | | |
|---|---|---|---|---|
| 6,288,860 B1 * | 9/2001 | Buch | ........................... | 360/48 |
| 6,967,808 B1 * | 11/2005 | Bandic et al. | ............ | 360/77.08 |
| 6,975,471 B2 * | 12/2005 | Bandic et al. | ................. | 360/48 |
| 6,995,938 B2 * | 2/2006 | Coker et al. | ................... | 360/75 |
| 7,003,674 B1 * | 2/2006 | Hamlin | ........................ | 713/193 |

OTHER PUBLICATIONS

MacWilliams and Sloane, Proceedings of the IEEE, vol. 64, No. 12, pp. 1715-1729.

* cited by examiner

*Primary Examiner*—Tan Dinh
*Assistant Examiner*—Dan I Davidson
(74) *Attorney, Agent, or Firm*—Thomas R. Berthold

(57) ABSTRACT

A data recording medium has tracks with pseudo-noise (PN) sequences with good autocorrelation properties as servo information for controlling the position of the recording head. A first set of alternating tracks uses a leading pseudo-random binary sequence (PRBS), which is a PN sequence with good autocorrelation properties, and a following PRBS that is cyclically shifted from the leading PRBS. A second set of alternating tracks interleaved with the first set also has a leading PRBS and a following PRBS that is cyclically shifted from the leading PRBS, but the leading PRBS in each of the tracks in the second set is offset along-the-track from the leading PRBS in the tracks of the first set. The head positioning control system uses the leading PRBS to generate a servo timing mark (STM), the cyclic shift to generate track identification (TID), and the following PRBS from adjacent tracks to generate the head position error signal (PES).

15 Claims, 11 Drawing Sheets

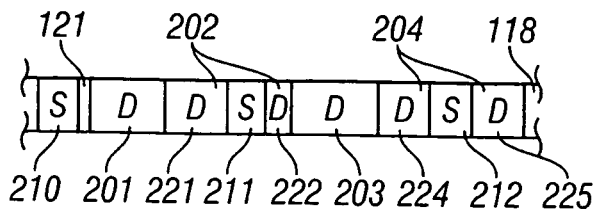
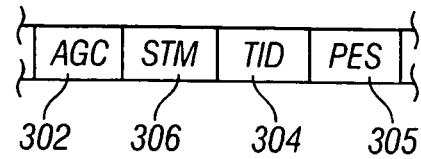
FIG. 2A
*(Prior Art)*
FIG. 2B
*(Prior Art)*
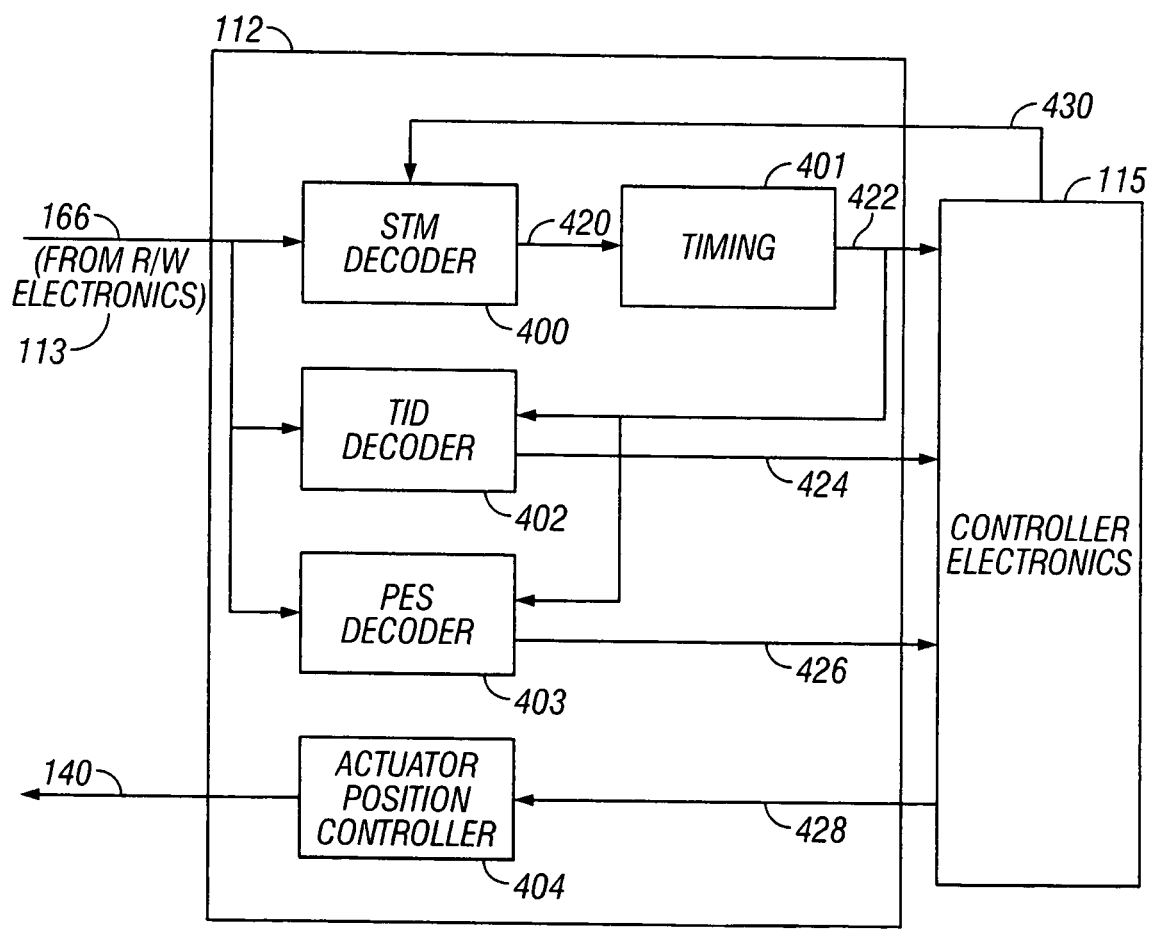
FIG. 3
*(Prior Art)*

$x^5 + x^4 + x^3 + x^2 + 1$

DATA RECORDING MEDIUM WITH SERVO PATTERN HAVING PSEUDO-NOISE SEQUENCES

RELATED APPLICATION

This application is related to concurrently filed application Ser. No. 10/841,034, filed May 6, 2004, now U.S. Pat. No. 6,995,938B2, and titled DATA RECORDING SYSTEM WITH SERVO PATTERN HAVING PSEUDO-NOISE SEQUENCES. Both applications are based on a common specification, with this application having claims directed to a data recording medium and application Ser. No. 10/841,034 having claims directed to a data recording system.

TECHNICAL FIELD

This invention relates generally to data recording systems, such as magnetic recording hard disk drives, and more particularly to pre-recorded servo patterns and servo positioning systems to locate and maintain the read/write heads on the data tracks.

BACKGROUND OF THE INVENTION

Magnetic recording hard disk drives use a servo-mechanical positioning system to hold the read/write head on the desired data track and to seek from track to track as required to perform read and write operations. Special "servo" information is written in fields in circumferentially-spaced servo sectors in each of the concentric data tracks on each disk surface. The servo pattern is constructed across multiple tracks so that the read-back signal from the head, as it passes over the pattern, can be decoded to yield the radial position of the head. The servo pattern is written onto the disk during manufacturing in a process known as servowriting.

In conventional servowriting the servo pattern is written in multiple passes using the regular write head in conjunction with a specialized servowriter. Each pass must be precisely aligned circumferentially. Misalignment introduces errors into the servo system. As the density of the tracks in the radial direction and the linear density of the data bits in the circumferential or along-track direction increase it becomes increasingly difficult to precisely align the servo fields circumferentially.

What is needed is a magnetic recording disk having a servo pattern, and a disk drive having a servo decoding system, that are not sensitive to misalignment of the pre-recorded servo fields.

SUMMARY OF THE INVENTION

The invention is a data recording medium in which the tracks have pseudo-noise (PN) sequences with good auto-correlation properties and capable of detection by a correlation filter as servo information. A PN sequence can be used to encode a servo timing mark (STM) to identify the start of the servo pattern in each of the tracks. A servo pattern with a PN sequence in each track, where the PN sequence is shifted along-the track from the PN sequence in adjacent tracks, can be decoded by the control system for track identification (TID) and for the position error signal (PES) representative of the position of the head between the tracks.

In one embodiment, a specific type of PN sequence called a pseudo-random binary sequence (PRBS) is used. A first set of alternating tracks has a leading PRBS and a following PRBS that is cyclically shifted from the leading PRBS. A second set of alternating tracks interleaved with the first set also has a leading PRBS and a following PRBS that is cyclically shifted from the leading PRBS, but the leading PRBS in each of the tracks in the second set is offset along-the-track from the leading PRBS in the tracks of the first set. The first or leading PRBS in the tracks is used by the head positioning control system as a STM. The cyclic shift increases by a fixed increment across the tracks and is used by the control system for the TID. The following PRBS in the tracks is used by the control system as the PES.

In a magnetic recording disk drive implementation of the invention, the servo pattern is in angularly-spaced servo sectors and the PRBS used in the sectors in the second set of alternating tracks is the inverse of the PRBS used in the sectors in the first set of alternating tracks. The disk drive includes a correlator that outputs a single positive dipulse each time a PRBS from the first set of tracks is detected and a single negative dipulse each time an inverted PRBS is detected. The zero-crossing of the dipulse from detection of the first or leading PRBS in each track is used as timing to generate a STM. The cyclic shift between the leading and following PRBS increases by a fixed increment with each track in the radial direction so that the length of the cyclic shift between the leading and following PRBS in each track represents the TID. The difference in amplitude of the dipulses from detection of the following PRBS in two adjacent tracks represents the PES sent to the disk drive actuator to maintain the head on track.

For a fuller understanding of the nature and advantages of the present invention, reference should be made to the following detailed description taken together with the accompanying figures.

BRIEF DESCRIPTION OF THE DRAWING

FIG. 2A is a portion of a typical data track on the disk of the disk drive shown in FIG. 1.

FIG. 2B is an expanded view of one of the servo sectors in the data track of FIG. 2A.

FIG. 3 is a block diagram of the servo electronics in the prior art disk drive in FIG. 1.

DETAILED DESCRIPTION OF THE INVENTION

Description of the Prior Art

Figure 1:
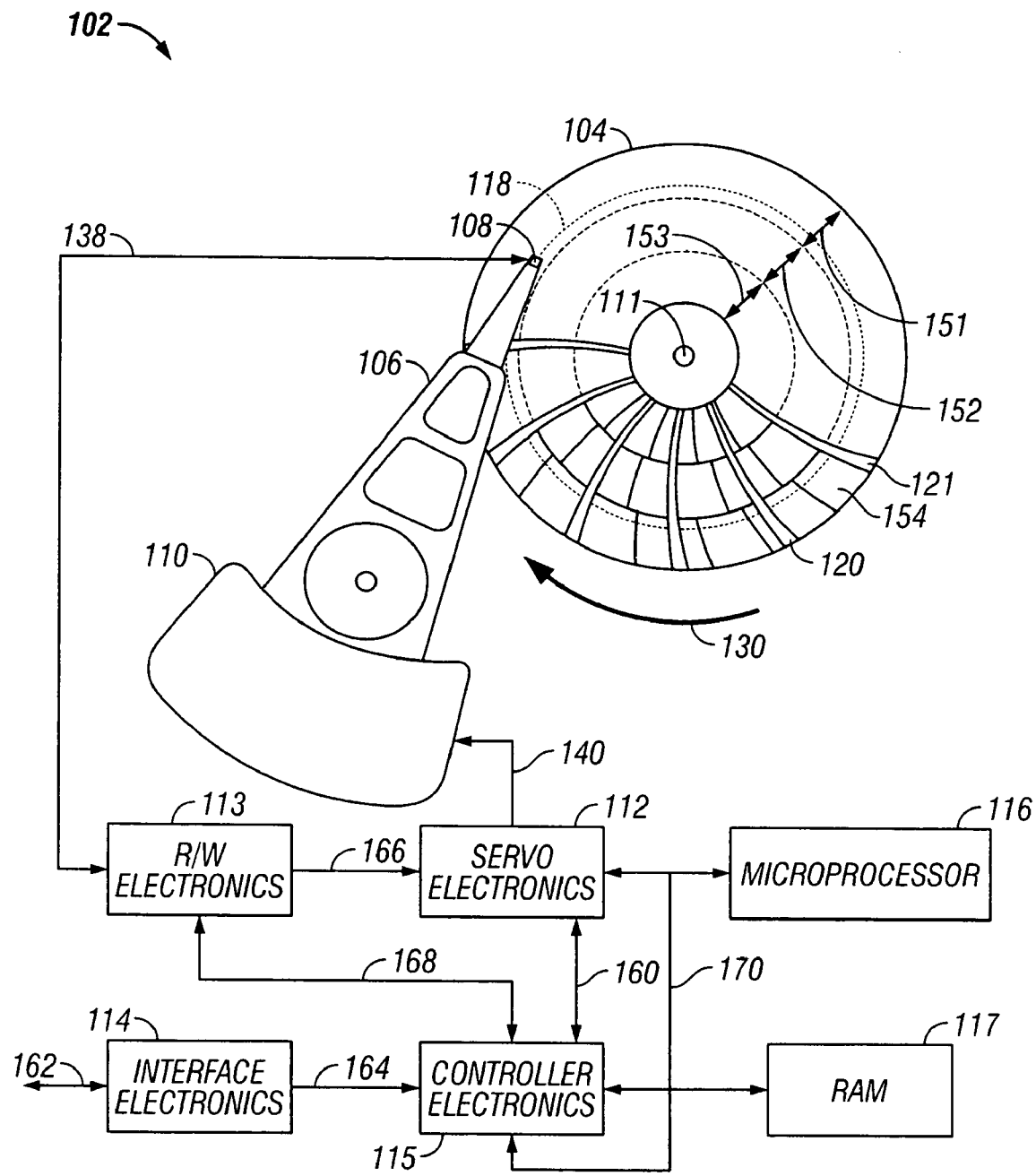
FIG. 1 is a block diagram of a prior art disk drive of the type usable with the present invention.

FIG. 1 is a block diagram of a disk drive of the type usable with the present invention. The disk drive depicted is one that is formatted using a fixed-block "headerless" architecture with sector servo and zone-bit recording (ZBR).

The disk drive, designated generally as 102, includes data recording disk 104, actuator arm 106, data recording transducer 108 (also called a head, recording head or read/write head), voice coil motor 110, servo electronics 112, read/write electronics 113, interface electronics 114, controller electronics 115, microprocessor 116, and RAM 117. The recording head 108 may be an inductive read/write head or a combination of an inductive write head with a magnetoresistive read head. Typically, there are multiple disks stacked on a hub that is rotated by a disk motor, with a separate recording head associated with each surface of each disk. Data recording disk 104 has a center of rotation 111 and is rotated in direction 130. Disk 104 is divided for head positioning purposes into a set of radially-spaced concentric tracks, one of which is shown as track 118. The tracks are grouped radially into a number of zones, three of which are shown as zones 151, 152 and 153. Each track includes a plurality of circumferentially or angularly-spaced servo sectors. The servo sectors in each track are aligned circumferentially with the servo sectors in the other tracks so that they extend across the tracks in a generally radial direction, as represented by radially-directed servo sections 120. Each track has a reference index 121 indicating the start of track. Within each zone, the tracks are also circumferentially divided into a number of data sectors 154 where user data is stored. The data sectors contain no data sector identification (ID) fields for uniquely identifying the data sectors so the drive is considered to have a "No-ID"™ type of data architecture, also called a "headerless" data architecture. If the disk drive has multiple heads, then the set of tracks which are at the same radius on all disk data surfaces is referred to as a "cylinder".

Read/write electronics 113 receives signals from head 108, passes servo information from the servo sectors to servo electronics 112, and passes data signals to controller electronics 115. Servo electronics 112 uses the servo information to produce a current at 140 which drives voice coil motor 110 to position head 108. Interface electronics 114 communicates with a host system (not shown) over interface 162, passing data and command information. Interface electronics 114 also communicates with controller electronics 115 over interface 164. Microprocessor 116 communicates with the various other disk drive electronics over interface 170.

In the operation of disk drive 102, interface electronics 114 receives a request for reading from or writing to data sectors 154 over interface 162. Controller electronics 115 receives a list of requested data sectors from interface electronics 114 and converts them into zone, cylinder, head, and data sector numbers which uniquely identify the location of the desired data sectors. The head and cylinder information are passed to servo electronics 112, which positions head 108 over the appropriate data sector on the appropriate cylinder. If the cylinder number provided to servo electronics 112 is not the same as the cylinder number over which head 108 is presently positioned, servo electronics 112 first executes a seek operation to reposition head 108 over the appropriate cylinder.

Once servo electronics 112 has positioned head 108 over the appropriate cylinder, servo electronics 112 begins executing sector computations to locate and identify the desired data sector. As servo sectors pass under head 108, headerless architecture technique identifies each servo sector. In brief, a servo timing mark (STM) is used to locate servo sectors, and a count of STMs from a servo sector containing an index mark 121 uniquely identifies each servo sector. Additional information is maintained in association with servo electronics 112 and controller electronics 115 for controlling the reading or writing of data in the data sectors.

In FIG. 2A a portion of a typical track 118 on the disk 104 is shown expanded. Four complete data sectors are shown (201, 202, 203 and 204). Three representative servo sectors 210, 211, and 212 are also shown. As can be seen from this example, some data sectors are split by servo sectors, and some data sectors do not start immediately following a servo sector. For example, data sectors 202 and 204 are split by servo sectors 211 and 212, respectively. Data sector 202 is split into data sections 221 and 222, and data sector 204 is split into data sections 224 and 225. Data sector 203 starts immediately after the end of data sector 202, rather than immediately following a servo sector. The index mark 121 indicates the beginning of the track and is shown contained in servo sector 210.

FIG. 2B is an expanded view of one of the servo sectors illustrated in FIG. 2A. Typically, each servo sector contains an STM 306. The STM 306 serves as a timing reference for reading the subsequent servo information in track identification (TID) field 304 and position error signal (PES) field 305. The STM is sometimes also referred to as a servo address mark or servo start mark. Each servo sector also contains an automatic gain control (AGC) field 302 for controlling a variable gain amplifier (VGA) that adjusts the strength of the signal read by head 108.

FIG. 3 is a block diagram of the servo electronics 112. In operation, controller electronics 115 provides input to actuator position control 404, which in turn provides a signal 140 to the actuator to position the head. The controller electronics 115 uses the servo information read from the servo sectors to determine the input 428 to the actuator position control 404. The servo information is read by the read/write electronics 113 (FIG. 1), and signals 166 are input to the servo electronics 112. STM decoder 400 receives a clocked data stream 166 as input from the read/write electronics 113, and a control input 430 from the controller electronics 115. Once an STM has been detected, an STM found signal 420 is generated. The STM found signal 420 is used to adjust timing circuit 401, which controls the operating sequence for the remainder of the servo sector.

After detection of an STM, the track identification (TID) decoder 402 receives timing information 422 from timing circuit 401, reads the clocked data stream 166, which is typically Gray-code encoded, and then passes the decoded TID information 424 to controller electronics 115. Subsequently, PES decode circuit 403 captures the PES signal from read/write electronics 166, then passes position information 426 to controller electronics 115. Inputs to the PES decode circuit 403 are typically analog, although they may be digital or of any other type. The PES decode circuit 403 need not reside within the servo electronics module 112.

Figure 4A:
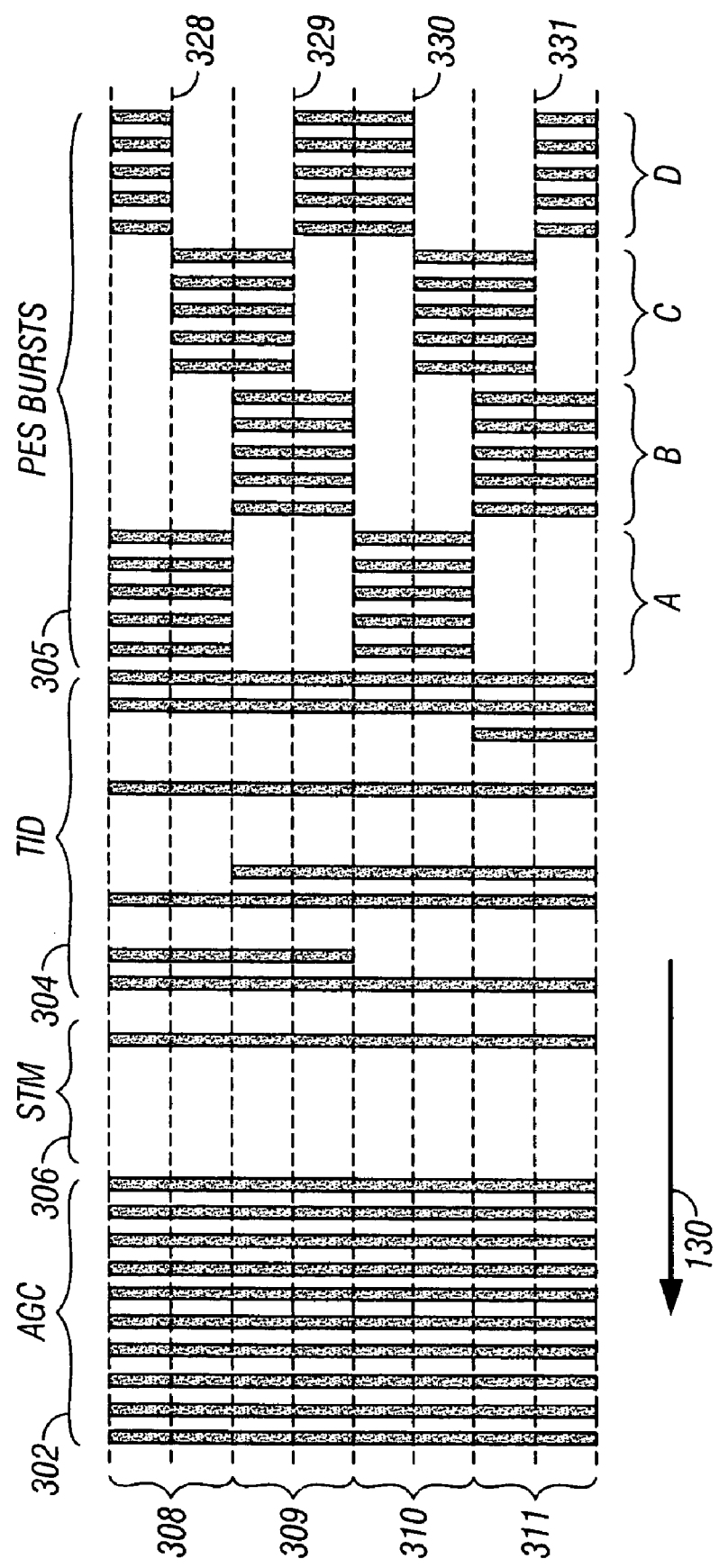
FIG. 4A is a prior art servo pattern with a quad-burst PES pattern.

FIG. 4A is a schematic of a conventional servo pattern of the type commonly used in sector servo systems and shows a greatly simplified pattern for clarity with only four tracks (tracks 308, 309, 310 and 311 having track centerlines 328, 329, 330 and 331, respectively). The servo pattern moves relative to head 108 in the direction shown by arrow 130.

The two possible magnetic states of the medium are indicated as black and white regions. FIG. 4A shows the servo pattern in only four radially-adjacent servo sectors in one servo section 120 of the disk, but the pattern extends radially through all the data tracks in each servo section 120.

The servo pattern is comprised of four distinct fields: AGC field 302, STM field 306, Track ID field 304 and PES field 305. The servo positioning information in PES field 305 is a conventional quad-burst pattern comprising bursts A–D. The automatic gain control (AGC) field 302 is a regular series of transitions and is nominally the same at all radial positions. The AGC field 302 allows the servo controller to calibrate timing and gain parameters for later fields. The STM field 306 is the same at all radial positions. The STM pattern is chosen such that it does not occur elsewhere in the servo pattern and does not occur in the data records. The STM is used to locate the end of the AGC field and to help locate the servo pattern when the disk drive is initialized. The TID field 304 contains the track number, usually Gray-coded and written as the presence or absence of recorded dibits. The TID field 304 determines the integer part of the radial position. The position error signal (PES) bursts A–D are used to determine the fractional part of the radial position. Each PES burst comprises a series of regularly spaced magnetic transitions, the transitions being represented by the transitions between the black and white regions in FIG. 4A. The PES bursts are arranged radially such that a burst of transitions are one track wide and two tracks apart, from centerline to centerline. PES bursts are offset from their neighbors such that when the head is centered over an even-numbered track (e.g., track 310 with centerline 330) the read-back signal from burst A is maximized, the read-back signal from burst B is minimized and the read-back signal from bursts C and D are equal. As the head moves off-track in one direction the read-back signal from burst C increases and the read-back signal from burst D decreases until, with the head half-way between tracks the read-back signal from burst C is maximized, read-back signal from burst D is minimized and read-back signals from bursts A and B are equal. As the head continues to move in the same direction the read-back signal from burst B increases and the read-back signal from burst A decreases until, with the head centered over the next track (with an odd track number, e.g. track 311 with centerline 331) the read-back signal from burst B is maximized, the read-back signal from burst A is minimized and the read-back from signals from bursts C and D are again equal.

Figure 4B:
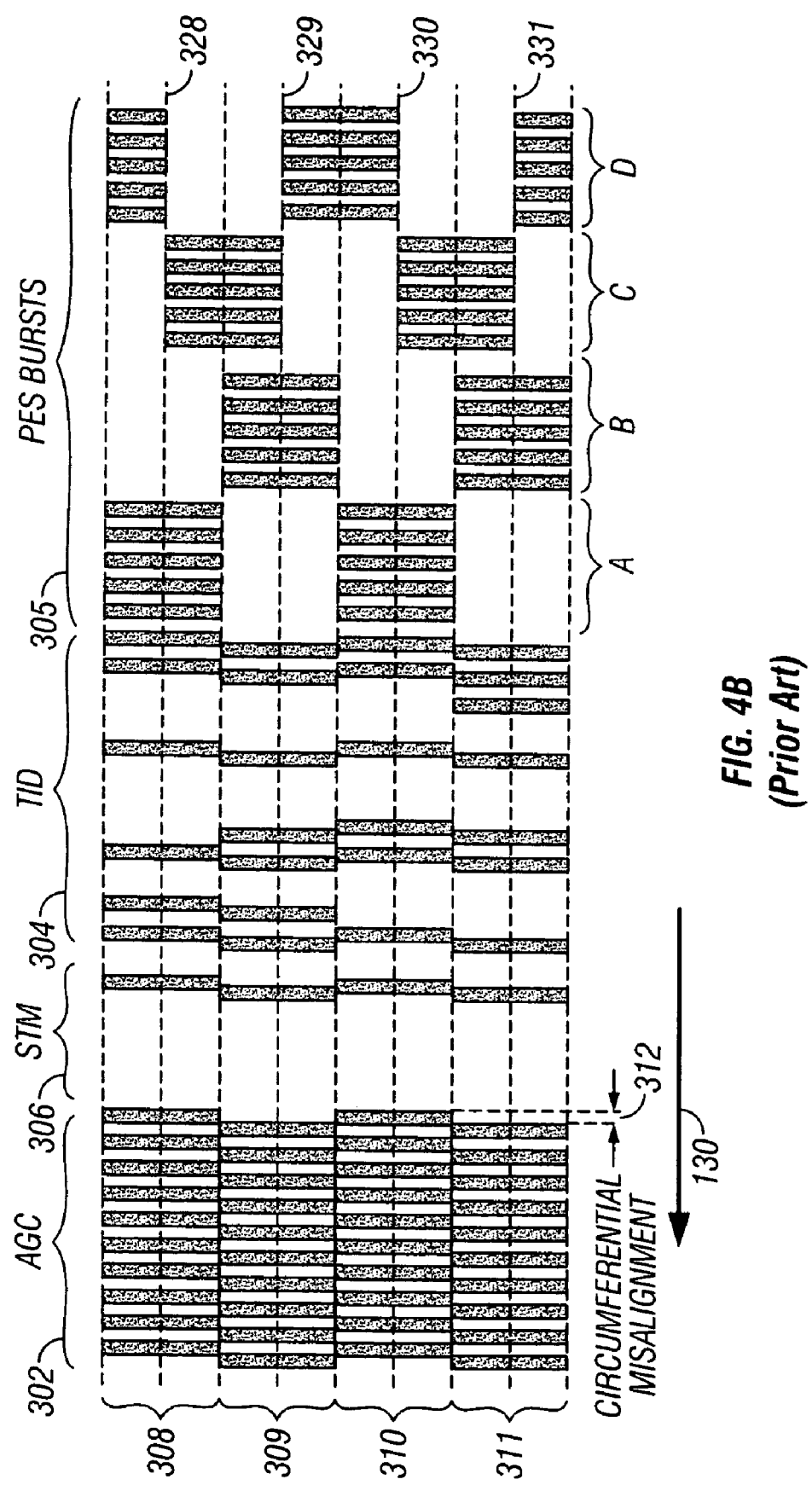
FIG. 4B shows the effect of circumferential misalignment on the prior art servo pattern in FIG. 4A.

The prior art servo pattern shown in FIG. 4A is written track-by-track with a regular write head. Alignment of each individual track with its neighbors is a key problem in writing the servo pattern. Two distinct alignment problems may occur. Track misregistration (TMR) occurs due to an error in the radial position of the head during servowriting. This translates to a repeatable error in the servo position information obtained from the servo pattern. Circumferential or along-track misalignment occurs due to an error in the circumferential position of the head during servowriting. Circumferential misalignment causes features which span more than one track to become irregular and distorted. FIG. 4B shows the effect of circumferential misalignment 312 on the servo pattern shown in FIG. 4A. In practice circumferential misalignment must be much smaller than the smallest circumferential feature in the servo pattern. As the recording density increases the servo pattern features become correspondingly smaller and circumferential misalignment becomes more of a problem.

The effect of circumferential misalignment is most pronounced where the head is reading significant contributions from features written on different tracks. For example, as shown in FIG. 4B, when the head is positioned mid-way between track centerline 328 and track centerline 329 the AGC field 302 contributions from the two tracks interfere destructively.

DESCRIPTION OF THE INVENTION

The invention will be described with respect to a magnetic recording hard disk drive implementation, but the invention is applicable in general to data recording systems that have data recorded in adjacent data tracks that also include servo information for positioning the data recording head or transducer.

The invention will be described using pseudo-random binary sequences (PRBS), but applies to the use of other pseudo-noise (PN) sequences. In the context of this invention, a PN sequence is any sequence with approximately noise-like autocorrelation properties suitable for detection by correlation filters. A PRBS is a specific type of PN sequence having very good autocorrelation properties, making it a good choice for the described embodiment.

Figure 5A:
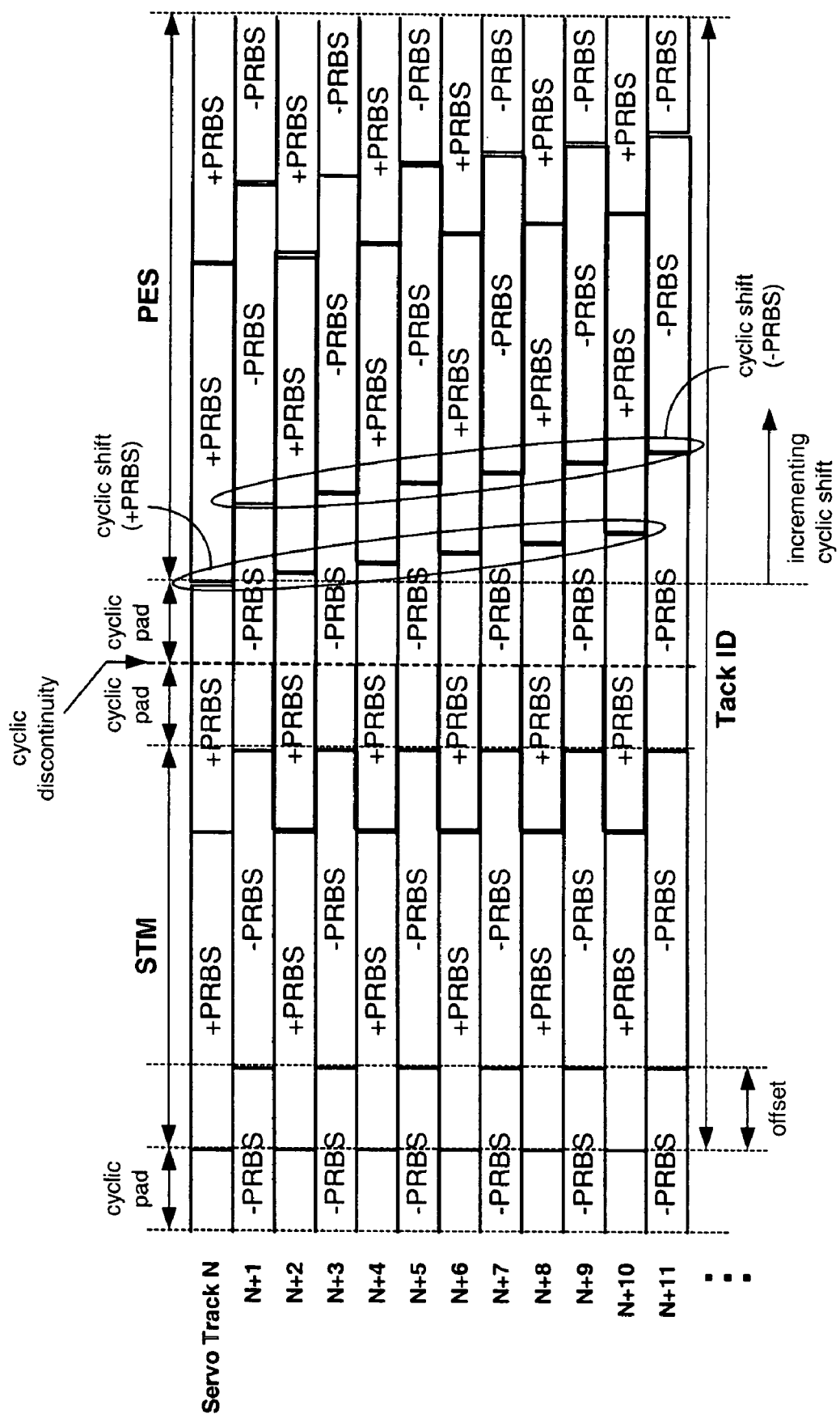
FIG. 5A is the servo pattern of the present invention

FIG. 5A shows the servo pattern of the present invention. The AGC, STM, TID, and PES fields in the prior art are replaced by a pair PRBS fields. The PRBS fields in each servo track are identical, but the PRBS fields in adjacent tracks are different. The first PRBS field in alternate tracks (e.g., the odd servo tracks) are offset from the first PRBS field in the other tracks (i.e., the even servo tracks). The first or leading PRBS field on a servo track serves as the STM. The STM provides a reference for windowing the second PRBS field which is used to encode both the TID and the PES. The TID is encoded in the circumferential phase relationship due to a cyclic shift between the first PRBS field and the second PRBS field. The PES is derived from the relative contributions of the second or following PRBS field from the different servo tracks as the read head crosses adjacent servo tracks in the radial direction. The PRBS fields provide an effective method for dealing with circumferential misalignment because the PRBS fields on adjacent tracks are not required to be precisely phase aligned.

The properties of a PRBS, the method of generating a PRBS, and the concept of correlation are well-known and described extensively in the technical literature, for example see MacWilliams and Sloane, *Proceedings of the IEEE*, VOL. 64, NO. 12, pp 1715–1729.

The correlation of two sequences a(t) and b(t) is defined as:

$$R_{a,b}(\tau) = \sum_t a(t)b(\tau+t)$$

This definition of correlation is well-known in the field of signal processing and is very similar to the statistical definition of correlation:

$$R_{a,b}(\tau) = E[a(t)b(\tau+t)] = \lim_{N\to\infty} \frac{1}{N}\sum_{t=0}^{N-1} a(t)b(\tau+t)$$

In both cases the quantity τ is known as the "lag" between sequences a and b. The correlation sum given above is very similar to the convolution sum and it can be shown that the correlation of a(t) with b(t) is equal to the convolution of a(t) with b(−t). As a corollary of this, the correlation of an input sequence a(t) with a fixed reference sequence b(t) can be obtained using a filter with impulse response b(−t). A filter of this sort is referred to as a correlator matched to sequence b(t).

A pseudo-random binary sequence (PRBS), also called a maximal-length shift-register sequence (M sequence), is a periodic sequence of binary bits with a number of interesting properties. In particular, the autocorrelation function of an N-bit PRBS, that is, the correlation of an N-bit PRBS pattern with itself, is 1 for zero lag and 1/N elsewhere, up to lag N (whereupon it repeats). This is the property that gives pseudo-random binary sequences their name since a sequence of purely random binary bits would have an autocorrelation 1 at zero lag and autocorrelation 0 elsewhere. A direct consequence of this property is that if a periodic PRBS is input to a correlator matched to a single period of the same PRBS, the correlator will output a single narrow pulse each time the PRBS repeats. If a periodic PRBS is recorded using a magnetic recording system and the resulting read-back signal input to a matched correlator the correlator will output the dipulse response of the magnetic recording system each time the PRBS repeats. For a finite-length (i.e., not repeating indefinitely) PRBS the correlator output will be valid after one full period has been input to the correlator, and will remain valid until the last sample of the PRBS has been input to the correlator.

Figure 10:
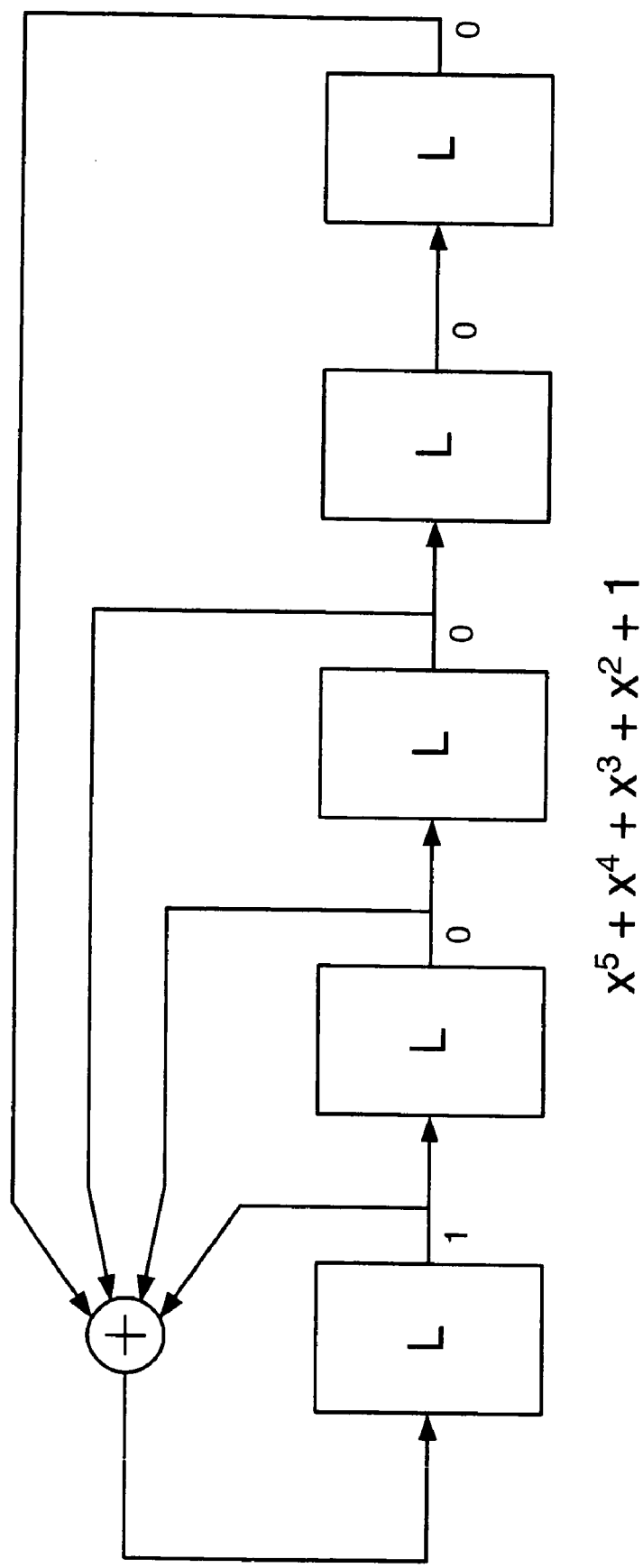
FIG. 10 is a diagram of a linear feed-back shift register (LFSR) commonly used to generate a PRBS.

A PRBS can be generated using a linear feedback shift register (LFSR) in which the feedback polynomial is primitive. A PRBS is typically $2^n-1$ bits long where n is an integer. FIG. 10 is an example of a LFSR with 5 latches that implement a $5^{th}$ order polynomial used to generate a 31-bit PRBS. For a $5^{th}$ order polynomial there exist 6 primitive polynomials that will produce a PRBS. In the preferred embodiment described here two PRBS are used. The two sequences are formed by taking a PRBS and that PRBS inverted, i.e., the PRBS with each 1 inverted to a 0 and each 0 inverted to a 1. The inverted sequence is also a PRBS has a dipulse response with polarity opposite that of the original sequence when input to a correlator matched to the original sequence. When the inverted PRBS is input to the correlator matched to the original PRBS, there exists a range over which there is zero correlation. Over this range of lag values the two sequences are said to be orthogonal. The correlator is a digital finite-impulse-response (FIR) filter matched to the PRBS. The correlator is matched in the sense that the impulse response of the filter h[k] is equal to one period of the time-reversed PRBS, that is $$h[k]=x[n-k]\ k=0, 1, \ldots n-1.$$

A consequence of the autocorrelation property of pseudo-random sequences is that when a PRBS is input to a matched correlator, the output is either 1 or −1/n.

Figure 5B:
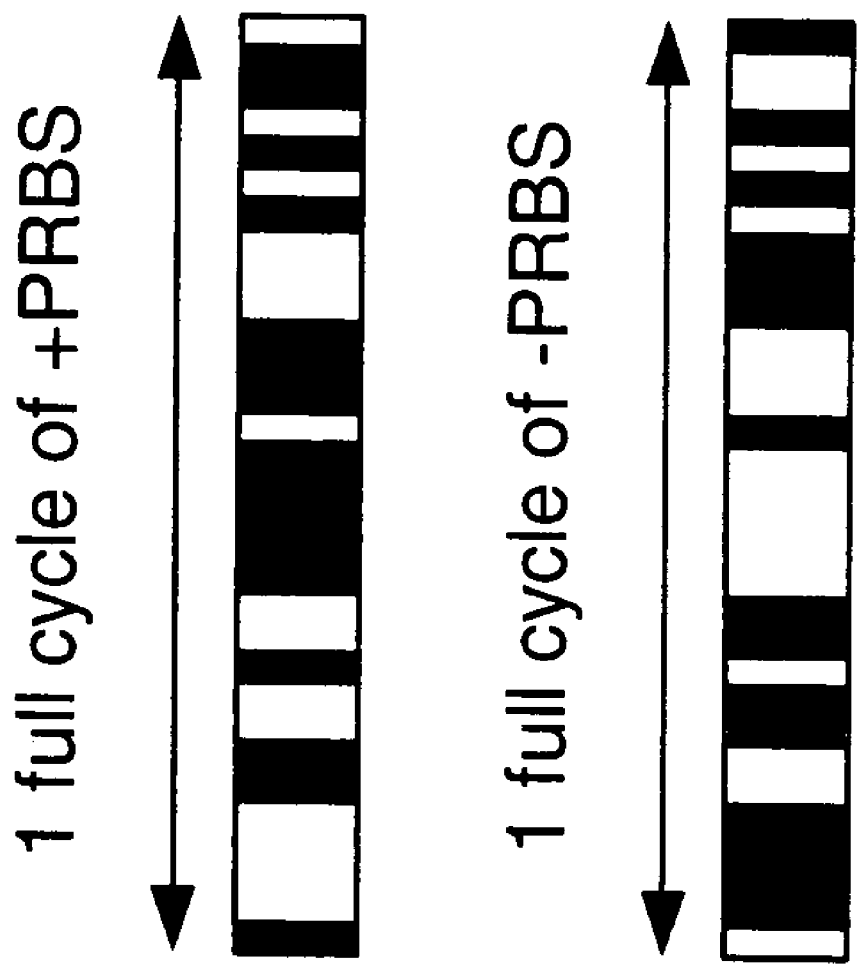
FIG. 5B is a pseudo-random binary sequence (PRBS) for the servo pattern in FIG. 5A.

In FIG. 5A, the patterns labeled +PRBS denote the original sequence and the patterns labeled −PRBS denote the inverted sequence. FIG. 5B shows an example of the recorded magnetization patterns from the original PRBS (+PRBS) and the inverted PRBS (−PRBS), wherein the dark regions represent positive ("north") magnetizations and the light regions represent negative ("south") magnetizations. The +PRBS is used in one set of alternate servo tracks (e.g., the even servo tracks) in FIG. 5A, and the −PRBS is used in the other set of alternate servo tracks (i.e., the odd servo tracks) interleaved with the first set. The first −PRBS in each odd servo track is offset from the +PRBS in each even servo track by a fixed number of bits. Thus the PRBS used in any track (a first track) is the inverse of the PRBS used in a second track immediately adjacent the first track. This allows the even and odd tracks to be uniquely identified. The STM field utilizes the uniqueness of these alternating tracks to resolve the offset that occurs between adjacent tracks.

In each track there is a cyclic shift between the leading PRBS used for the STM field and the following PRBS used for the PES field. The cyclic shift is incremented as the servo track number increases. Between the STM field and the PES field is a cyclic discontinuity which results from the break in the PRBS created by incrementing the cyclic shifts in the PES field. The STM field and the PES field taken together comprise the Track ID (TID) field.

Before and after each PRBS field is a cyclic pad which is part of the period of the PRBS. The output of the correlator is valid only for the length of the two cyclic pads combined with the length of the extra PRBS required to obtain the offset between adjacent tracks. The longer the cyclic pad, the longer the output of the correlator remains valid.

Figure 6:
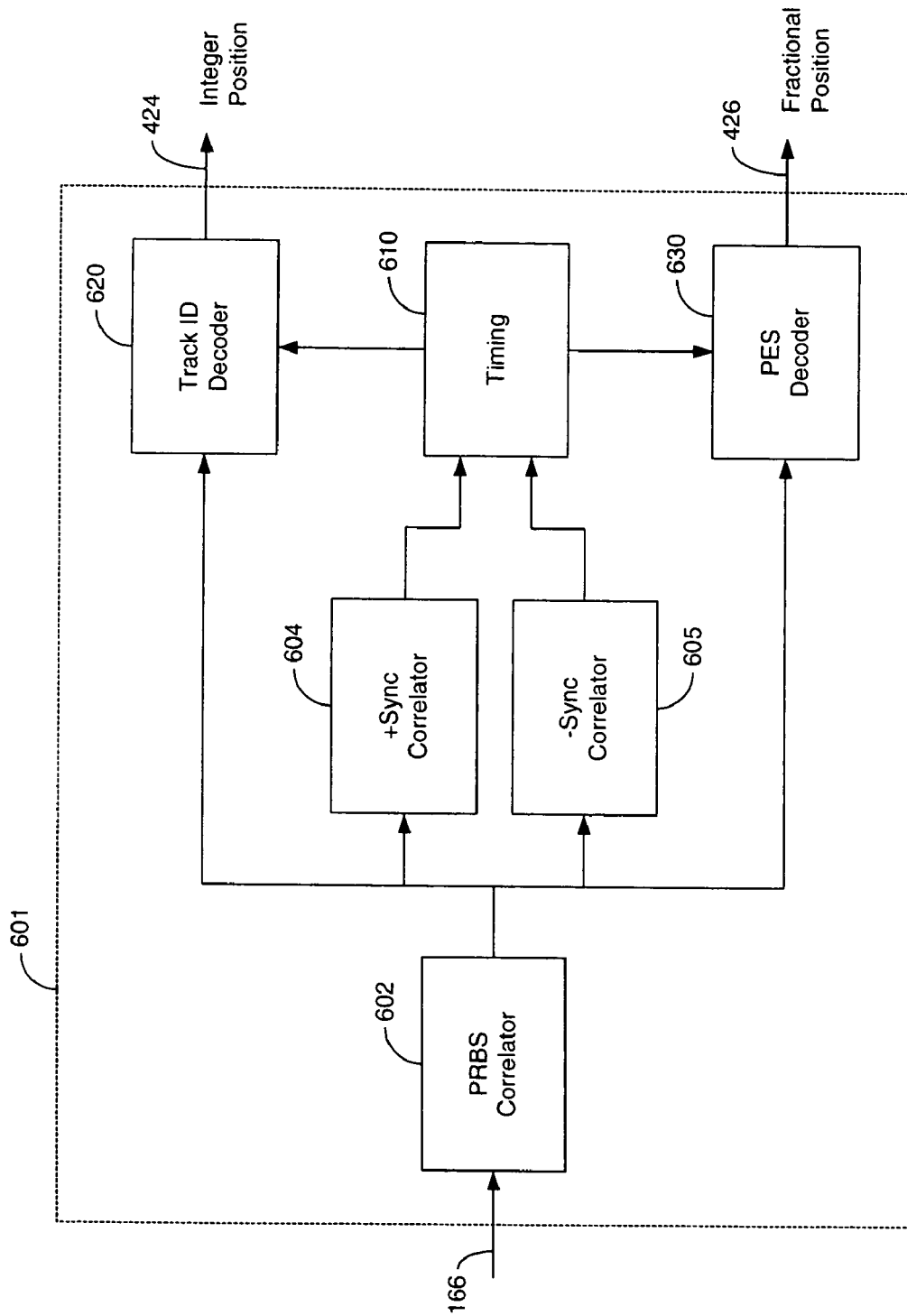
FIG. 6 is a block diagram of the servo decoder of the present invention.

FIG. 6 is a block diagram of the servo decoder 601 that replaces the prior art STM decoder 400, TID decoder 402 and PES decoder 403 (FIG. 3). The read-back signal from R/W Electronics 113 (FIG. 3) is input at 166 to the +PRBS Correlator 602 which is matched to the +PRBS. When the correlator 602 matches a +PRBS it produces a positive dipulse. When the correlator 602 receives a −PRBS input it produces a negative dipulse. The output of correlator 602 is input to the +Sync Correlator 604 and the −Sync Correlator 605. The sync correlators 604, 605 act as matched filters for the dipulse outputs from +PRBS Correlator 602 and produce signal peaks at the zero-crossings of the dipulse outputs. The +Sync Correlator 604 produces a positive peak at the zero-crossing of the +PRBS dipulse response while the −Sync Correlator 605 produces a positive peak at the zero-crossing of the −PRBS dipulse response. Thus the +Sync Correlator 604 uniquely identifies even tracks that have a positive dipulse response while the −Sync Correlator 605 uniquely identifies odd tracks that have a negative dipulse response. The outputs of Sync Correlators 604, 605 feed into the Timing control block 610 which generates windowing for the TID Decoder 620 and the PES Decoder 630. The TID Decoder 620 calculates the integer portion of the head position and the PES Decoder 630 calculates the fractional portion of the head position.

Figure 7:
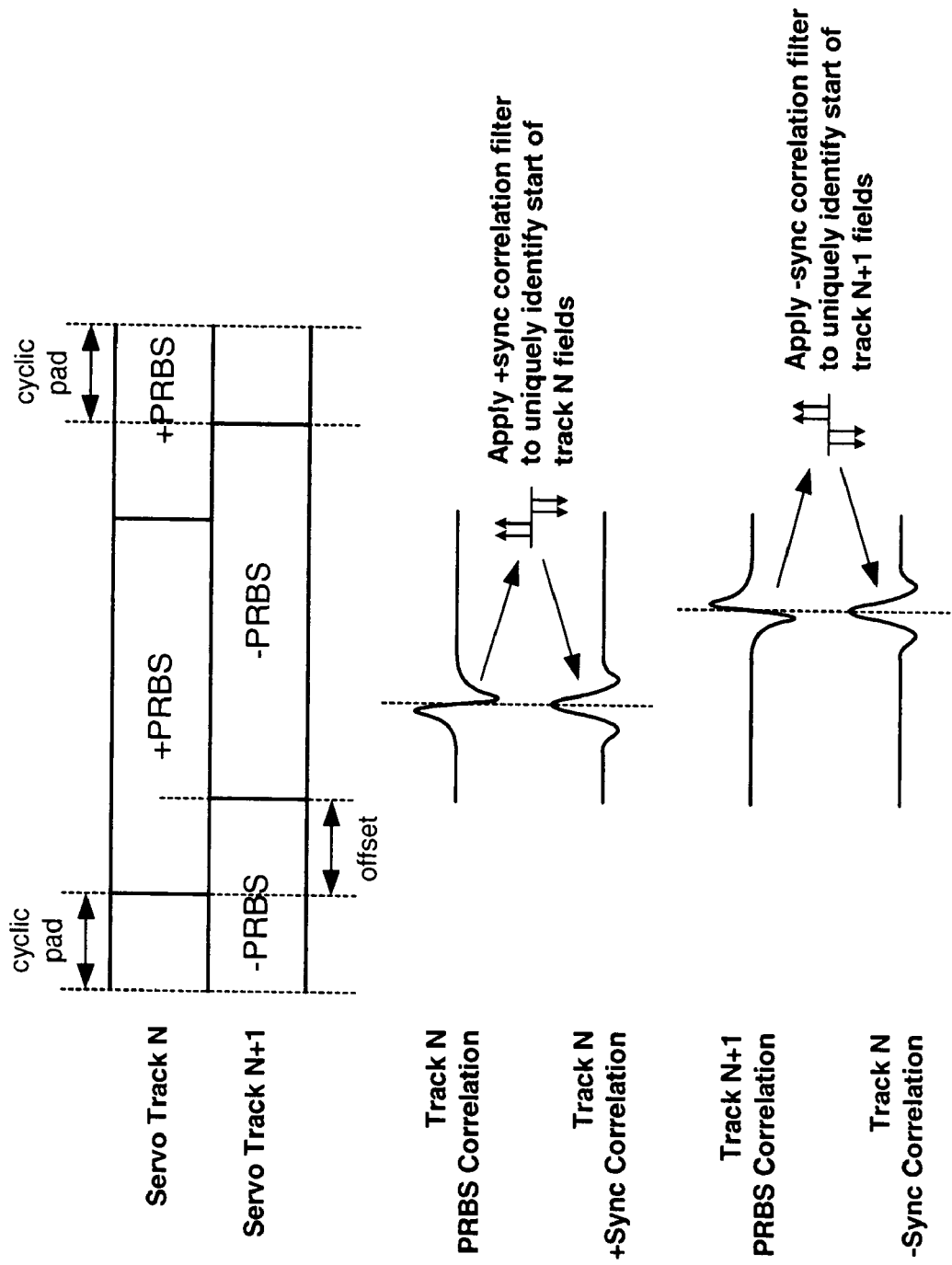
FIG. 7 shows the output of the correlator and how it is used to detect the servo timing mark (STM) for the servo pattern in FIG. 5A.

FIG. 7 shows the typical correlator dipulse output for the STM field as the head moves from Track N to adjacent Track N+1. Here the use of alternating +PRBS patterns and −PRBS patterns for adjacent tracks, with the −PRBS patterns having a fixed offset from the +PRBS patterns allows the even and odd tracks to be uniquely identified. The zero-crossing of the correlator 602 output is identified by finding the peak of the output of the Sync Correlators 604, 605. By uniquely identifying the even and odd tracks, the offset on adjacent tracks can be taken into consideration by the Timing control block 610 which generates windowing for the TID Decoder 620 and the PES Decoder 630. Thus the outputs of the Sync Correlators 604, 605 for the PRBS in the STM field act as the STM decoder.

Figure 8:
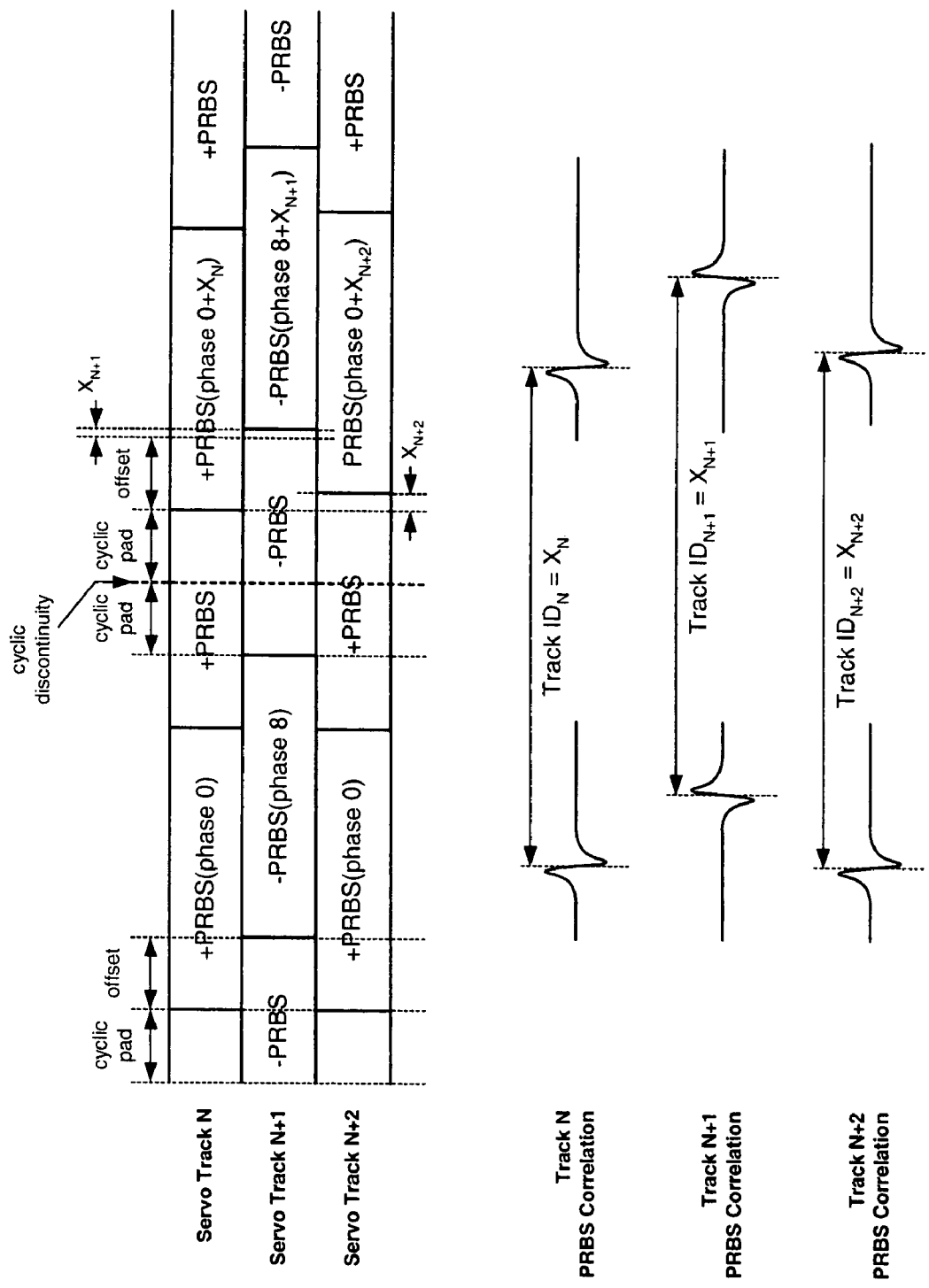
FIG. 8 shows the output of the correlator and how it is used to decode the track identification (TID) field for the servo pattern in FIG. 5A.

FIG. 8 shows the typical correlator 602 dipulse output for the TID field as the head moves from Track N to Track N+2. The location of the dipulse zero-crossing indicates the circumferential position of the recorded PRBS. The cyclic shift between the leading and following PRBS in each servo track changes by a fixed increment as the servo track number increases. The TID is resolved in TID Decoder 620 (FIG. 6)

by comparing the phase or cyclic shift of the second or following PRBS relative to the first or leading PRBS. In the example of FIG. 8, the fixed offset of the first −PRBS field in Track N+1 is eight bits from the first +PRBS field in Track N. Thus the first PRBS on Track N is at phase zero while the second PRBS on Track N is at phase zero plus $X_N$. The phase difference or cyclic shift $X_N$ is directly proportional to the Track N TID that is output at 424 by TID Decoder 620. The first PRBS on Track N+1 is at phase eight (because of the fixed offset of 8 bits) while the second PRBS on Track N is at phase eight plus $X_{N+1}$. Again, the phase difference or cyclic shift $X_{N+1}$ is directly proportional to the Track N+1 TID that is output at 424 by TID Decoder 620. The cyclic shift is incremented a fixed number of bits, e.g. one bit, with each track. As shown in the example of FIG. 8, the cyclic shift is 1 bit per track, so $X_N$ is zero, $X_{N+1}$ is 1 bit, and $X_{N+2}$ is 2 bits.

The fixed offset between adjacent tracks, which in this example is eight, is chosen to provide a suitable region over which the patterns are orthogonal. The optimum value depends on the length of the PRBS and the density of the recorded pattern. In addition, the use of the +PRBS and the −PRBS for even and odd tracks is not required for decoding the TID field but is a useful property for decoding the STM field. Thus if a separate mark or pattern is used for the STM, then the same PRBS can be used for all the tracks, provided there is the fixed circumferential offset between the leading PRBS in adjacent tracks.

Figure 9:
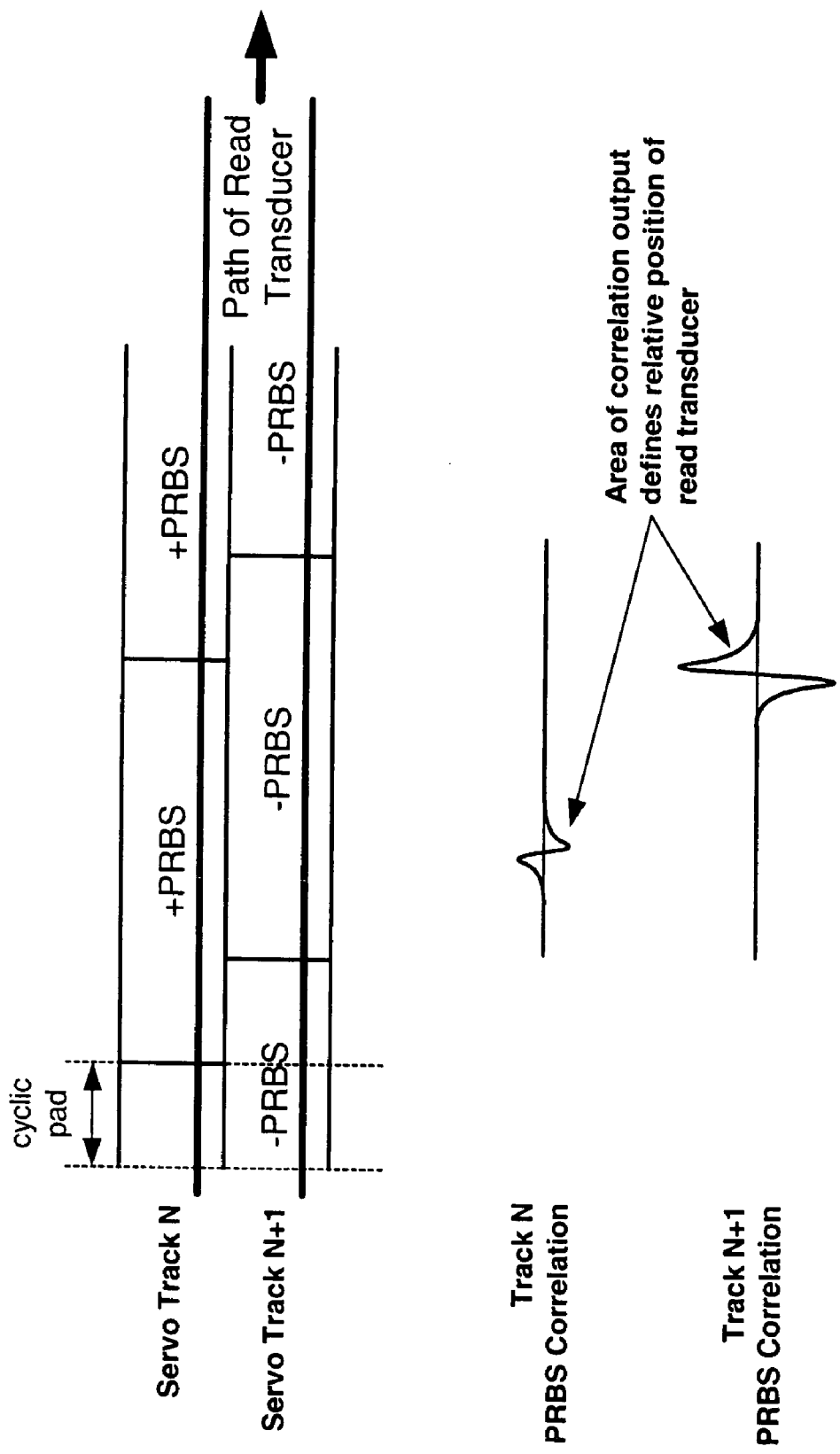
FIG. 9 shows the output of the correlator and how it is used to decode the position error signal (PES) field for the servo pattern in FIG. 5A.

FIG. 9 shows the typical correlator 602 dipulse output that is sent to PES Decoder 630 as the head moves from Track N to adjacent Track N+1 and reads the PES field. With the head positioned directly above Track N, the correlator 602 produces a strong output for the +PRBS in the PES field. As the head moves from Track N to Track N+1 the correlator output for the +PRBS in the PES field in Track N decreases while the output for the −PRBS in the PES field of Track N+1 increases. With the head positioned midway between Track N and Track N+1 the output for the +PRBS and the −PRBS are equal. With the head positioned directly above Track N+1, the correlator 602 produces a strong output for the −PRBS. In the preferred embodiment, the magnitude of the output is measured as the sum of the absolute values of the correlator output within a specified time window. The contribution of an even track is measured in a window centered on the dipulse response of the +PRBS while the contribution of an odd track is measured in a window centered on the dipulse response of the −PRBS. Again, the use of the +PRBS and the −PRBS patterns for even and odd tracks is not required for decoding the PES but is a useful property for decoding the STM field. Also, while in the preferred embodiment the PRBS used in the PES field in each track is identical to the PRBS used in the STM field, the PES field can be a different PRBS, which would require its own correlator.

In the above description two PRBS are used in each track, with the first or leading PRBS field being used to decode the STM and the second or following PRBS field being used for the PES. However the invention is fully applicable to a system wherein a PRBS is used to encode either the STM or the PES. For example, the system described above for using the PRBS in adjacent tracks to determine the PES can be used with other conventional techniques for determining STM and TID, without the need for a separate leading PRBS field in each track.

The pitch of the servo tracks is not necessarily the same as the pitch of the data tracks. The pitch for servo tracks is arbitrary but preferably related to the effective width of the read transducer. If the track pitch is too small, then the effective read width will cover more than two tracks. This degrades the performance of the system since the PRBS patterns are orthogonal for only two tracks in the radial direction. If the servo track pitch is too large, then there will be regions in the radial direction for which the decoded PES changes little or not at all.

Also, the area of the dipulse response for either the STM field or the PES field can be used for gain control on subsequent servo sectors.

As mentioned, the invention is not limited to magnetic recording hard disk drives, but is generally applicable to data recording systems that have data recorded in adjacent data tracks that also include servo information for positioning the data recording head or transducer. These systems include magnetic tape recording systems and optical disk recording systems.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A recording medium having a plurality of tracks containing servo position information that form a servo pattern, the servo pattern comprising:
   in a first track, a first-track pseudo-noise (PN) sequence; and
   in a second track adjacent the first track, a second-track PN sequence offset along-the-track from the first-track PN sequence.

2. The medium of claim 1 wherein each of the first-track PN sequence and the second-track PN sequence is a pseudo-random binary sequence (PRBS).

3. The medium of claim 1 wherein the first-track PN sequence is different from the second-track PN sequence.

4. The medium of claim 1 wherein the second-track PN sequence is the first-track PN sequence inverted.

5. The medium of claim 1 further comprising a cyclic pad preceding each PN sequence, the cyclic pad being a fixed portion of a period of the PN sequence it precedes.

6. The medium of claim 1 wherein the medium is a magnetic recording medium.

7. The medium of claim 1 wherein the medium is a recording disk.

8. The medium of claim 1 wherein the first-track PN sequence is the leading PN sequence in the first track, wherein the second-track PN sequence is the leading PN sequence in the second track, and further comprising:
   in said first track, a PN sequence following the leading PN sequence; and
   in said second track, a PN sequence following the leading PN sequence.

9. The medium of claim 8 wherein the leading PN sequence and following PN sequence in each track are identical, and further comprising:
   in said first track, a cyclic shift between the leading PN sequence and its following PN sequence; and
   in said second track, a cyclic shift between the leading PN sequence and its following PN sequence, the cyclic shift in the second track being different from the cyclic shift in the first track.

10. The medium of claim 9 wherein the medium has a plurality of alternating first and second tracks and wherein the cyclic shift in a track increases by a fixed increment across successive adjacent tracks.

11. A magnetic recording disk having a plurality of concentric circular tracks, each track having a plurality of angularly-spaced servo sectors, the servo sectors in each track being aligned generally circumferentially and radially with servo sectors in adjacent tracks, and wherein the servo sectors in radially-adjacent tracks form a servo pattern comprising:
(a) in each of a first set of alternating tracks, a leading pseudo-noise sequence with autocorrelation and capable of detection by a correlation filter (PN sequence) and a following PN sequence identical to the leading PN sequence;
(b) in each of a second set of alternating tracks interleaved with said first set, a leading PN sequence circumferentially offset from the leading PN sequence in said first set and a following PN sequence identical to the leading PN sequence; and
wherein each track has a cyclic shift between the leading and following PN sequence, the cyclic shift increasing by a fixed increment across successive adjacent tracks.

12. The disk of claim 11 wherein each PN sequence is a pseudo-random binary sequence (PRBS).

13. The disk of claim 11 wherein the PN sequence in the second set of tracks is different from the PN sequence in the first set of tracks.

14. The disk of claim 11 wherein the PN sequence in the second set of tracks is the inverted PN sequence in the first set of tracks.

15. The disk of claim 11 further comprising a cyclic pad preceding each PN sequence, the cyclic pad being a fixed portion of a period of the PN sequence it precedes.

* * * * *